United States Patent
Ohike

(10) Patent No.: US 12,156,529 B2
(45) Date of Patent: *Dec. 3, 2024

(54) LIQUID CONDIMENT CONTAINING SOLID INGREDIENT

(71) Applicants: MIZKAN HOLDINGS CO., LTD., Aichi (JP); MIZKAN CO., LTD., Aichi (JP)

(72) Inventor: Masaki Ohike, Aichi (JP)

(73) Assignees: Mizkan Holdings Co., Ltd., Aichi (JP); Mizkan Co., Ltd., Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,988

(22) Filed: Mar. 15, 2019

(65) Prior Publication Data

US 2019/0208804 A1 Jul. 11, 2019

Related U.S. Application Data

(63) Continuation of application No. PCT/JP2017/033231, filed on Sep. 14, 2017.

(30) Foreign Application Priority Data

Sep. 16, 2016 (JP) .................. 2016-181188

(51) Int. Cl.
| | | |
|---|---|---|
| A23L 23/00 | (2016.01) | |
| A23L 19/00 | (2016.01) | |
| A23L 27/00 | (2016.01) | |
| A23L 27/10 | (2016.01) | |
| A23L 27/18 | (2016.01) | |

(52) U.S. Cl.
CPC ............... *A23L 23/00* (2016.08); *A23L 19/03* (2016.08); *A23L 27/00* (2016.08); *A23L 27/105* (2016.08); *A23L 27/18* (2016.08); *A23L 27/80* (2016.08); *A23V 2002/00* (2013.01); *A23V 2250/022* (2013.01); *A23V 2250/21* (2013.01)

(58) Field of Classification Search
CPC .......... A23L 23/00; A23L 19/03; A23L 27/00; A23L 27/80; A23L 27/105; A23L 27/18; A23V 2002/00; A23V 2250/022; A23V 2250/21
USPC ....................................................... 426/650
See application file for complete search history.

(56) References Cited

U.S. PATENT DOCUMENTS

2003/0170374 A1 9/2003 Bahoshy

FOREIGN PATENT DOCUMENTS

| JP | S59-140858 A | 8/1984 | |
|---|---|---|---|
| JP | H01-181764 A | 7/1989 | |
| JP | 08173082 A * | 7/1996 | |
| JP | H08-317772 A | 12/1996 | |
| JP | H11-130 A | 1/1999 | |
| JP | 2007209295 A | 8/2007 | |
| JP | 2007236213 A | 9/2007 | |
| JP | 2009189324 A | 8/2009 | |
| JP | 2011152147 A | 8/2011 | |
| JP | 2011177098 A | 9/2011 | |
| JP | 2012170353 A | 9/2012 | |
| JP | 201342736 A | 3/2013 | |
| JP | 201399306 A | 5/2013 | |
| JP | 201550969 A | 3/2015 | |
| WO | WO-2005084459 A1 * | 9/2005 | ............. A23L 27/60 |
| WO | WO-2006087857 A1 * | 8/2006 | ............. A23B 4/033 |

OTHER PUBLICATIONS

Wolf WO 2005084459 A1—English Translation, pp. 1-9. (Year: 2005).*
Okada WO2006087857 A1—English Translation, pp. 1-12. (Year: 2006).*
Taguchi et al. JPH08173082—English Translation, pp. 1-7. (Year: 1996).*
Van Eck et al., Shape up! How shape, size and addition of condiments influence eating behavior towards vegetables , Food Funct., 2019, 10, 5739-5751.*
Extended European Search Report issued in European Application No. 17850973.3, issued Mar. 25, 2020 (9 pages).
International Search Report issued in International Application No. PCT/JP2017/033231; mailed Nov. 14, 2017 (2 pages).
Written Opinion issued in International Application No. PCT/JP2017/033231; Dated Nov. 14, 2017 (5 pages).
T. Suzuki, et al., Article "Change in Angle of Repose of Potato Starch during Ball-Millng", J. Soc. Power Technol., Japan, vol. 39, 449-453, Jun. 10, 2002, with partial English translation (5 pages).

* cited by examiner

*Primary Examiner* — Jeffrey P Mornhinweg
(74) *Attorney, Agent, or Firm* — Osha Bergman Watanabe & Burton LLP

(57) ABSTRACT

A liquid condiment includes a seasoning liquid, a solid ingredient including one or more dried vegetables that are immersed and swollen in the seasoning liquid, and one or more selected from the group consisting of vinegar, a fruit juice, a flavoring oil, a flavor, and a spice extract. The liquid condiment includes 0 to 30% by mass of the swollen vegetables having a size of 0.5 mm or more and less than 3 mm, 0 to 60% by mass of the swollen vegetables having a size of 3 mm or more and less than 8 mm, and 0 to 30% by mass of the swollen vegetables having a size of 8 mm or more and less than 20 mm. The total amount of the swollen vegetables having a size of 0.5 mm or more and less than 20 mm is 5 to 60% by mass.

11 Claims, No Drawings

LIQUID CONDIMENT CONTAINING SOLID INGREDIENT

TECHNICAL FIELD

One or more embodiments of the present invention relate to a liquid condiment containing an ingredient such as a vegetable.

BACKGROUND

Various condiments in which vegetables are blended into liquid condiments are reported. For example, a method of blending vegetable particles into a liquid condiment with the viscosity and the stirred state adjusted, in order to provide a texture and savor of the vegetable particles to salad or meat (Patent Literature 1), a vegetable particle-containing liquid condiment obtained by heating vegetable particles and the like and a 5'-nucleotide with pure soy sauce to a certain product temperature in order to improve the taste of the 5'-nucleotide and the savor of grated garlic, grated Japanese radish, or the like (Patent Literature 2), a vegetable-containing acidic processed food in which vegetable vinegar obtained by subjecting a vegetable such as celery to acetic acid fermentation, vegetable pieces, and the like are blended (Patent Literature 3), and a vegetable piece-containing liquid condiment having a sugar, a polysaccharide thickener, and vegetable pieces of 0.5 mm or more and having a viscosity of 3,000 mPa·s or less (Patent Literature 4) are reported. However, for these vegetable-containing liquid condiments, attention is paid to the savors of the blended vegetables per se, but little attention is paid to changes in the savors of the liquid condiments per se.

Acetic acid contained in vinegar is effective for blood pressure reduction in hypertensives, visceral fat reduction in potentially obese people, and the like, and it is desired to positively take in vinegar. In addition, vinegar is known to have health functions such as calcium absorption promotion, recovery from fatigue, and appetite promotion, and a bacteriostatic effect providing food poisoning prevention and extension of storage life.

On the other hand, the boiling point of acetic acid is 118° C. and it volatilizes and dissipates in cooking such as roasting, stir-frying, and using a range.

In addition, liquid condiments such as sauces to which aroma components e.g., fruit juices and flavors are added are commercially available. But, when the above condiments are used for cooking, the aroma components volatilize, and cooked dishes cannot be sufficiently savored.

PATENT LITERATURE

Patent Literature 1: JP-A-Hei 8-317772
Patent Literature 2: JP-A-2013-99306
Patent Literature 3: JP-A-2013-42736
Patent Literature 4: JP-A-2007-236213

As described above, when liquid condiments in which vinegar and flavoring components such as fruit juices and flavors are blended are during cooking, the vinegar and the flavors volatilize, and cooked dishes may not be sufficiently savored, and the vinegar and the like may not be sufficiently taken in.

SUMMARY

One or more embodiments of the present invention provide a solid ingredient-containing liquid condiment containing vinegar, a flavoring component, and a vegetable, in which even in cooking, the volatilization of the vinegar and the flavoring component is prevented, and a cooked dish can be well savored.

Accordingly, the present inventor has variously studied means for blending a vegetable, the shape of the vegetable, and the like and as a result found that by blending a vegetable serving as a solid ingredient in a dry state and swelling it in a condiment, and adjusting the size of the vegetable after the swelling in a certain range, a solid ingredient-containing liquid condiment is obtained in which vinegar and a flavoring component are retained in a vegetable, and even in cooking such as roasting or stir-frying, the volatilization of the above flavoring component is suppressed, and a cooked dish can be well savored. Thus, the present inventor has completed the one or more embodiments of the present invention.

Specifically, one or more embodiments of the present invention may provide the following [1] to [6].

[1] A solid ingredient-containing liquid condiment comprising an ingredient comprising a dried vegetable, and one or more selected from the group consisting of vinegar, a fruit juice, a flavoring oil, a flavor, and a spice extract, comprising the dried vegetable satisfying 1) to 3) in an amount of from 5 to 60% by mass in total after swelling based on an entire condiment, 1) the condiment comprises the dried vegetable having a size of 0.5 mm or more and less than 3 mm after swelling in an amount of from 0 to 30% by mass based on the entire condiment 2) the condiment comprises the dried vegetable having a size of 3 mm or more and less than 8 mm after swelling in an amount of from 0 to 60% by mass based on the entire condiment 3) the condiment comprises the dried vegetable having a size of 8 mm or more and less than 20 mm after swelling in an amount of from 0 to 30% by mass based on the entire condiment.

[2] The solid ingredient-containing liquid condiment according to [1], wherein an aspect ratio of the dried vegetable is in the range of from 1 to 10.

[3] The solid ingredient-containing liquid condiment according to [1] or [2], wherein the ingredient has a repose angle of $40°<\alpha<50°$ in a dry state, and the repose angle is obtained from "tan $\alpha=H/r$" by measuring a height H (cm) which is a difference between a highest portion of a retaining edge for retaining the solid ingredient and a highest portion of a generally conical laminate having symmetry wherein the generally conical laminate is formed by an injection method on a fixed disk having a radius r (cm) and having the retaining edge.

[4] The solid ingredient-containing liquid condiment according to any of [1] to [3], wherein the dried vegetable is one or more dried vegetables selected from the group consisting of onion, cabbage, Chinese cabbage, carrot, spring onion, celery, and paprika.

[5] The solid ingredient-containing liquid condiment according to any of [1] to [4], wherein the flavor is an emulsion type flavor or an oil-soluble flavor.

[6] The solid ingredient-containing liquid condiment according to any of [1] to [5], wherein the liquid condiment is for cooking.

When the solid ingredient-containing liquid condiment of one or more embodiments of the present invention is used, vinegar and a flavoring component such as a lemon, ginger, or mustard savor can be further retained, and a cooked dish has a good savor even when the cooked dish is maintained at high temperature for a long time, or heated again by a cooking heater, microwaves, or the like after once getting cold.

DETAILED DESCRIPTION OF THE EMBODIMENTS

The solid ingredient-containing liquid condiment of one or more embodiments of the present invention is a condiment comprising a solid ingredient comprising a dried vegetable, and one or more selected from the group consisting of vinegar, a fruit juice, a flavoring oil, a flavor, and a spice extract, and comprises the dried vegetable satisfying 1) to 3) in an amount of from 5 to 60% by mass in total after swelling based on the entire condiment.

1) the condiment comprises the dried vegetable having a size of 0.5 mm or more and less than 3 mm after swelling in an amount of from 0 to 30% by mass based on the entire condiment 2) the condiment comprises the dried vegetable having a size of 3 mm or more and less than 8 mm after swelling in an amount of from 0 to 60% by mass based on the entire condiment 3) the condiment comprises the dried vegetable having a size of 8 mm or more and less than 20 mm after swelling in an amount of from 0 to 30% by mass based on the entire condiment The size of the dried solid ingredient is taken as the length of the longest width of the solid ingredient. (This is hereinafter described as long width.) This is represented by the average value of the lengths of the long widths of 50 solid ingredients obtained by measuring the length of long width (major axis) for the 50 solid ingredients.

The dried vegetable is included in the solid ingredient. When a raw vegetable is used instead of the dried vegetable, the savors of the vinegar and the flavoring component are not easily maintained after cooking. As the dried vegetable, dried vegetable pieces satisfying the conditions of 1) to 3) are used, and the amount of water in the dried vegetable pieces may be preferably 8% by mass or less, more preferably 6% by mass or less, and further preferably 5% by mass or less in terms of retaining larger amounts of the vinegar and the flavoring component even after cooking.

The dried vegetable may be one prepared by mixing with a sugar or immersion in a solution containing a sugar before drying. Specific examples of the sugar include glucose, fructose, sucrose, lactose, and starch decomposition products, and two or more may be used. The amount of the sugar added, the mixing time, and the concentration and the heating and mixing temperature and time in the case of immersion in the sugar solution, and the temperature and time of the following drying should be arbitrarily selected according to the type and size of the vegetable, and the like. The amount added in the case of mixing with the sugar may be preferably from 5 to 30% by mass based on the solid ingredient, the concentration of the sugar in the case of immersion in the solution may be preferably from 5 to 30% by mass, and the conditions of heating and mixing in the solution may be preferably from 50 to 80° C. and from 10 minutes to 12 hours.

The dried vegetable may be one obtained by heating and mixing a cut vegetable in a solution of a calcium salt and then drying it. The concentration of the calcium salt solution, the heating temperature, and the temperature and time of the following drying should be arbitrarily selected according to the type and size of the vegetable, and the like. Specifically, a cut vegetable should be stirred in an aqueous solution in which a calcium salt such as calcium chloride, calcium lactate, or calcium acetate is dissolved in water at 0.5 to 5% by mass, at 50 to 80° C. for 1 to 120 minutes, then separated from the treatment liquid, drained, and then dried at 65 to 80° C. for 3 to 12 hours. 5 To 30% by mass of a sugar such as glucose, fructose, sucrose, or lactose can also be contained in the above calcium aqueous solution.

A case where the shape of the dried vegetable piece is a granular shape compared with a flake shape and a needle shape may be preferred particularly in terms of the retention of the vinegar and the flavoring component after cooking. The aspect ratio of the dried vegetable piece is taken as the ratio between the shortest width (hereinafter described as short width) and the long width of the solid ingredient. This is represented by the average value for 50 solid ingredients obtained by measuring each of the length of long width (major axis) and the length of short width (minor axis) for the 50 solid ingredients and obtaining the ratio of the length of long width to the length of short width for each. The aspect ratio of the dried vegetable piece may be preferably in the range of from 1 to 20, more preferably in the range of from 1 to 10, and further preferably in the range of from 1 to 5. When the above aspect ratio of the dried vegetable piece is in the above range, the dried vegetable piece is more granular, and the flavoring component is easily retained inside the vegetable piece, and the savor retention is good.

In terms of the retention of the vinegar and the flavoring component after cooking, it may be preferred that the dried vegetable pieces have a repose angle $\alpha$ of $38°<\alpha<60°$, and the repose angle is obtained from "$\tan \alpha = H/r$" by measuring a height H (cm) which is the difference between the highest portion of a retaining edge for retaining the solid ingredient and the highest portion of a generally conical laminate having symmetry wherein the generally conical laminate is formed by an injection method on a fixed disk having a radius r (cm) and having the retaining edge. In one or more embodiments, the repose angle is more preferably $40°<\alpha<55°$, further preferably $40°<\alpha<50°$.

The type of the dried vegetable is not particularly limited, but those to be eaten after heat-cooking may be preferred. Examples thereof include onion, cabbage, Chinese cabbage, carrot, green pepper, Japanese radish, Japanese radish leaves, beet, lotus root, burdock, spring onion, perilla, celery, parsley, paprika, tomato, cucumber, corn, cauliflower, eggplant, potato, sweet potato, taro, yam, and pumpkin. Among these, onion, cabbage, Chinese cabbage, carrot, spring onion, celery, and paprika may be preferred, and onion, cabbage, Chinese cabbage, and carrot may be more preferred. One or more of these dried vegetables can be used.

The dried vegetable pieces can be produced by cutting to a predetermined size followed by drying, or drying followed by cutting. Examples of the drying method include hot air drying, freeze drying, drying by heating under reduced pressure, microwave drying, sun drying, and natural drying.

In retaining the vinegar and the flavoring component even after cooking, it is important that the dried vegetable pieces satisfy the 1) to 3) and are contained in an amount of from 5 to 60% by mass in total after swelling based on the entire condiment.

1) the condiment contains the dried vegetable having a size of 0.5 mm or more and less than 3 mm after swelling in an amount of from 0 to 30% by mass based on the entire condiment 2) the condiment contains the dried vegetable having a size of 3 mm or more and less than 8 mm after swelling in an amount of from 0 to 60% by mass based on the entire condiment 3) the condiment contains the dried vegetable having a size of 8 mm or more and less than 20 mm after swelling in an amount of from 0 to 30% by mass based on the entire condiment When the total content of the dried vegetable pieces is less than 5% by mass, the aroma rising (fragrance) after cooking is weak, and the retention of the savor is not sufficient. When the total content of the dried vegetable pieces is more than 60% by mass, the savor of the vegetable raw material is strong, and the balance of the savors is not sufficient, and the fluidity of the liquid condiment is poor, and the liquid condiment is difficult to remove.

In one or more embodiments, a preferred range of the total content is from 10 to 55% by mass, more preferably from 15 to 55% by mass, and further preferably from 20 to 55% by mass.

It is important that the above conditions of 1) to 3) be satisfied simultaneously with a total content of from 5 to 60% by mass. Thus, by using one or more of 1) to 3), a total content of 5% by mass or more is satisfied. Therefore, there is no case where all of 1) to 3) are 0% by mass.

In one or more embodiments, more preferred conditions are as follows.

1') the condiment contains the dried vegetable having a size of 0.5 mm or more and less than 3 mm after swelling in an amount of from 0 to 30% by mass based on the entire condiment 2') the condiment contains the dried vegetable having a size of 3 mm or more and less than 8 mm after swelling in an amount of from 0 to 60% by mass based on the entire condiment 3') the condiment contains the dried vegetable having a size of 8 mm or more and less than 20 mm after swelling in an amount of from 0 to 20% by mass based on the entire condiment In one or more embodiments, further preferred conditions are as follows.

1") the condiment contains the dried vegetable having a size of 0.5 mm or more and less than 3 mm after swelling in an amount of from 0 to 30% by mass based on the entire condiment 2") the condiment contains the dried vegetable having a size of 3 mm or more and less than 8 mm after swelling in an amount of from 5 to 50% by mass based on the entire condiment 3") the condiment contains the dried vegetable having a size of 8 mm or more and less than 20 mm after swelling in an amount of from 5 to 15% by mass based on the entire condiment Here, the size of the vegetable piece is the size after swelling in the liquid condiment, and for the content, the size of the vegetable piece is specified by the average value of the lengths of the long widths of 50 solid ingredients after swelling in the liquid condiment.

The seasoning liquid of the condiment of one or more embodiments of the present invention contains one or more selected from the group consisting of vinegar, a fruit juice, a flavoring oil, a flavor, and a spice extract. In one or more embodiments, the seasoning liquid more preferably contains vinegar and contains one or more selected from the group consisting of a fruit juice, a flavoring oil, and a flavor.

The vinegar used in one or more embodiments of the present invention is not particularly limited, and examples thereof include grain vinegar, rice vinegar, cider vinegar, spirit vinegar, grape vinegar, synthetic vinegar, black vinegar, Chinese vinegar, sherry vinegar, malt vinegar, and balsamic vinegar. One of these vinegars may be used alone, or two or more may be used together.

In one or more embodiments, the acetic acid concentration in the seasoning liquid is preferably from 0.05 to 2% by mass, more preferably from 0.1 to 1.75% by mass, and further preferably from 0.5 to 1.5% by mass. The adjustment of pH and acetic acid concentration is preferably performed by the content of the vinegar.

The fruit juice used in one or more embodiments of the present invention is not particularly limited, and examples thereof include fruit juices derived from lemon, yuzu (*citrus junos*), sudachi (*citrus sudachi*), lime, orange, grapefruit, apple, peach, grape, strawberry, pear, banana, melon, kiwi fruit, pineapple, cassis, acerola, blueberry, apricot, guava, plum, mango, papaya, litchi, and the like. Among these, fruit juices of citruses such as lemon, yuzu, sudachi, lime, orange, and grapefruit, and apple may be more preferred.

In one or more embodiments, the content of the fruit juice is preferably from 2 to 40% by mass, more preferably from 5 to 30% by mass, and further preferably from 8 to 20% by mass.

The flavoring oil is not particularly limited, and examples thereof include ginger oil, garlic oil, mustard oil, onion oil, sesame oil, spring onion oil, Chinese chive oil, Japanese parsley oil, perilla oil, wasabi oil, and lemon oil. One of these flavoring oils may be used alone, or two or more may be used together.

In one or more embodiments, the content of the flavoring oil is preferably from 0.01 to 2% by mass, more preferably from 0.02 to 1% by mass, and further preferably from 0.1 to 1% by mass.

Examples of the flavor include ginger flavors, garlic flavors, mustard flavors, onion flavors, sesame flavors, spring onion flavors, Chinese chive flavors, perilla flavors, wasabi flavors, and lemon flavors. One of these flavors may be used alone, or two or more may be used together.

The flavor may be any one of a water-soluble flavor, an emulsion type flavor, and an oil-soluble flavor, but in terms of retaining the flavor in the vegetable, and in terms of retaining the flavoring component even after cooking the liquid condiment, an emulsion type flavor or an oil-soluble flavor may be preferred, and an emulsion type flavor may be more preferred.

In one or more embodiments, the content of the flavor is preferably from 0.01 to 2% by mass, more preferably from 0.02 to 1% by mass, and further preferably from 0.1 to 1% by mass.

The spice extract is not limited as long as it is an extract of a food generally labeled as "spice". Examples thereof include red pepper extracts, mustard extracts, ginger extracts, wasabi extracts, pepper extracts, garlic extracts, onion extracts, and Japanese pepper extracts. One of these spice extracts may be used alone, or two or more may be used together in any combination and ratio.

In one or more embodiments, the content of the spice extract is preferably from 0.01 to 2% by mass, more preferably from 0.02 to 1% by mass, and further preferably from 0.1 to 1% by mass.

A dried fruit can also be used as long as it does not influence the savor. Examples of the dried fruit include lemon, yuzu (*citrus junos*), sudachi (*citrus sudachi*), lime, orange, grapefruit, apple, pineapple, peach, grape, strawberry, pear, banana, melon, kiwi fruit, cassis, acerola, blueberry, apricot, guava, plum, mango, papaya, and litchi.

Among these, lemon, yuzu, sudachi, lime, orange, grapefruit, apple, and pineapple may be preferred. One or more of these dried fruits can be used.

In addition, water, salt, soy sauce, a spice, a sugar, a protein material, an organic acid, an amino acid-based condiment, a nucleic acid-based condiment, animal and plant extracts, a fermented condiment, an alcoholic beverage, a stabilizer, a colorant, a viscosity-adjusting agent, a calcium salt, and the like can be contained in the condiment liquid.

In one or more embodiments, the pH of the seasoning liquid in the liquid condiment is preferably from 2 to 5 in terms of texture maintenance. It is difficult to keep the texture during storage under pH 2, and excessive heat sterilization is required over pH 5, and so it is difficult to keep the texture. In one or more embodiments, the pH is more preferably from 2.5 to 4.5, further preferably from 3 to 4.

For the solid ingredient, in addition to the dried vegetable pieces, for example, a raw vegetable, a grated vegetable, and a pasty vegetable can be used in the case of a vegetable. For dried solid ingredients, for example, a dried seed, a dried mushroom, a dried meat, and a dried fish and shellfish can be used.

The liquid condiment of one or more embodiments of the present invention can be produced, for example, by adding a solid ingredient containing dried vegetable pieces to the seasoning liquid, heating the mixture with stirring by a stirrer for a certain time, heat-sterilizing it at 85° C. for 30 seconds, cooling it to 65° C., then filling it into a container, and cooling it to about room temperature.

In the liquid condiment of one or more embodiments of the present invention, the savors of the vinegar and the flavoring component can be maintained after long-term storage or even in cooking. Therefore, the liquid condiment of one or more embodiments of the present invention can be used for a condiment for hot pot, a condiment for noodles, a condiment for cooked rice, a condiment for kamameshi (rice, meat and vegetable dish served in a small pot), a condiment for ankake (food dressed with a thick starchy sauce), a condiment for grilled meat, a condiment for daily dishes, a condiment for tofu (soybean curd), a condiment for fried rice, a condiment for tempura bowls, sesame sauce, a condiment for jiaozi (Chinese dumpling), a condiment for dressed dishes, a condiment for hamburg steaks, a condiment for steaks, a condiment for saute, a condiment for microwave oven use, a condiment for sundubu (Korean soft tofu stew), a condiment for stir-fries, a condiment for takikomi gohan (rice dish cooked with other ingredients), a condiment for gomoku gohan (rice dish cooked with five other ingredients), a condiment for kimchi (Korean pickle), a condiment for deep-fried dishes, a condiment for ramen, a condiment for stew, a condiment for shabu-shabu (hotpot dish with thin sliced meat parboiled in hot soup), a condiment for dip, and a condiment for pasta, and the like. The liquid condiment of one or more embodiments of the present invention is useful particularly for condiments for cooking added during cooking or used by pouring after cooking, and may be particularly preferably used as a condiment for grilled meat, a condiment for daily dishes, a condiment for pasta, a condiment for fried rice, or a condiment for jiaozi.

EXAMPLES

Next, one or more embodiments of the present invention will be described in more detail by Examples.

Examples 1 to 7 and Comparative Examples 1 to 8

(Methods)
<Preparation of Solid Ingredients>
The outer skin of onion was removed. The onion was grated, or cut to 2 mm square, 4 mm square or 8 mm square.
Part of each of the above grated onion and cut onion was hot air-dried.
<Preparation of Seasoning Liquid>
8% By mass of sugar, 8% by mass of brewed vinegar (acidity 15%), 4% by mass of common salt, 0.2% by mass of sodium glutamate, 0.3% by mass of xanthan gum, and 0.1% by mass of a lemon flavoring (emulsion type) were mixed with water.
<Preparation of Solid Ingredient-Containing Liquid Condiment>
Each solid ingredient was introduced into the seasoning liquid at a content based on the entire liquid seasoning liquid as shown in the following table. The mixture was stirred so as to be uniform, then heat-sterilized at 85° C. for 5 minutes, and filled into a bottle. Whether the vegetable pieces used are dried or not, the repose angle of the vegetable pieces, the solid ingredient content (% by mass) of the obtained solid ingredient-containing liquid condiment, the aspect ratio of the solid ingredient, and the results of sensory evaluation, fluidity, and comprehensive evaluation are described in Table 1 and Table 2.
(Evaluation Method)
After stew-cooking was done at 95° C. for 10 minutes, sensory evaluation was performed according to the following criteria by comparison with the sample before the heat treatment by a total of four trained sensory examiners.
<Sensory Evaluation Methods>
<Intensity of Lemon Savor of Liquid Condiment>
  5; the lemon savor remains very well
  4; the lemon savor remains well
  3; the lemon savor remains a little
  2; substantially no lemon savor remains
  1; no lemon savor remains
<Preferability of Savor of Seasoning Liquid>
  5; very good
  4; good
  3; slightly good
  2; slightly poor
  1; poor
<Fluidity>
  5; very good
  4; good
  3; slightly good
  2; slightly poor
  1; poor
<Comprehensive Evaluation>
  AA; balanced and extremely good
  BB; good
  CC; slightly poorly balanced and slightly poor
  DD; poor

TABLE 1

|  | Examples | | | | | | |
| --- | --- | --- | --- | --- | --- | --- | --- |
|  | 1 | 2 | 3 | 4 | 5 | 6 | 7 |
| Whether dried or not | Dried | Dried | Dried | Dried | Dried | Dried | Dried |
| Solid ingredient content (% by mass) | | | | | | | |
| 0.5 to 3 mm | 1 | 5 | 8 | 5 | 27 | 0 | 0 |
| 3 to 8 mm | 5 | 25 | 50 | 0 | 5 | 1 | 5 |
| 8 to 20 mm | 0 | 1 | 2 | 0 | 0 | 5 | 25 |
| Aspect ratio of solid ingredient | 2.3 | 2.3 | 2.3 | 1.5 | 1.5 | 6.4 | 6.4 |
| Repose angle α | 47 | 47 | 47 | 45 | 45 | 48 | 48 |
| <Sensory evaluation result> | | | | | | | |
| Intensity of lemon savor | 3 | 5 | 5 | 3 | 3 | 3 | 4 |
| Preferability of savor of seasoning liquid | 4 | 5 | 4 | 3 | 4 | 5 | 4 |
| Fluidity | 5 | 4 | 3 | 5 | 4 | 4 | 2 |
| Comprehensive evaluation | BB | AA | AA | BB | BB | BB | BB |

TABLE 2

|  | Comparative Examples | | | | | | | |
| --- | --- | --- | --- | --- | --- | --- | --- | --- |
|  | 1 | 2 | 3 | 4 | 5 | 6 | 7 | 8 |
| Whether dried or not | Not dried | Not dried | Not dried | Dried | Dried | Dried | Dried | Dried |
| Solid ingredient content (% by mass) | | | | | | | | |
| to 0.5 mm (powder, grated) | 0 | 0 | 0 | 5 | 30 | 60 | 0 | 0 |
| 0.5 to 3 mm | 0 | 0 | 0 | 0 | 0 | 0 | 60 | 0 |
| 3 to 8 mm | 5 | 30 | 60 | 0 | 0 | 0 | 0 | 0 |
| 8 to 20 mm | 0 | 0 | 0 | 0 | 0 | 0 | 0 | 60 |
| Aspect ratio of solid ingredient | 2.5 | 2.5 | 2.5 | 1.5 | 1.5 | 1.5 | 1.5 | 6.4 |
| Repose angle α | — | — | — | 43 | 43 | 43 | 45 | 48 |
| <Sensory evaluation result> | | | | | | | | |
| Intensity of lemon savor | 1 | 1 | 2 | 1 | 1 | 1 | 4 | 4 |
| Preferability of savor of seasoning liquid | 5 | 4 | 2 | 5 | 4 | 1 | 2 | 2 |
| Fluidity | 5 | 4 | 1 | 5 | 4 | 2 | 1 | 1 |
| Comprehensive evaluation | DD | DD | DD | DD | DD | DD | CC | CC |

From Table 1, for the liquid condiments of Examples 1 to 7 in which a particular amount of dried vegetable pieces having a particular size were used, the evaluation of the intensity and preferability of the savor and the fluidity after the cooking was good, and the comprehensive evaluation was also excellent.

From Table 2, for Comparative Examples 1 to 3 in which the solid ingredient was not dried, particularly the savor was weak, and Comparative Examples 1 to 3 were not satisfactory. In addition, for the liquid condiments of Comparative Examples 4 to 8 in which a particular amount of vegetable pieces having a particular size were not used even when dried vegetable pieces were used, the evaluation of the intensity and preferability of the savor and the fluidity was low, and the comprehensive evaluation was not satisfactory.

Examples 8 to 16 and Comparative Examples 9 to 14

(Methods)
<Preparation of Solid Ingredients>
Onion, cabbage, and carrot were cut and hot air-dried. Mustard seed and sesame were hot air-dried as they were.

<Preparation of Seasoning Liquid>
8% By mass of sugar, 8% by mass of brewed vinegar (acidity 15%), 4% by mass of common salt, 0.2% by mass of sodium glutamate, 0.3% by mass of xanthan gum, and a flavor shown in Table 3 or 4 were each mixed with water.

<Preparation of Solid Ingredient-Containing Liquid Condiment>
Each solid ingredient was introduced into the seasoning liquid at 30% by mass based on the entire liquid condiment. The mixture was stirred so as to be uniform, then heat-sterilized at 85° C. for 5 minutes, and filled into a bottle.

The type and the repose angle of the vegetable pieces used, the solid ingredient content (% by mass) and the flavor content (% by mass) of the obtained solid ingredient-containing liquid condiment, the aspect ratio of the solid ingredient, and the result of sensory evaluation are described in Table 3 and Table 4.

<Sensory Evaluation Method>
After stew-cooking at 95° C. for 10 minutes, sensory evaluation was performed according to the following criteria by comparison with the sample before the heat treatment by a total of four trained sensory examiners.

<Intensity of Aroma of Liquid Condiment>
5; the aroma remains very well
4; the aroma remains well
3; the aroma remains a little
2; the aroma slightly remains
1; no aroma remains <Sensory Evaluation Method>
After stew-cooking at 95° C. for 10 minutes, the solid ingredient-containing liquid condiment was transferred to a flat dish and stored at 60° C. for 4 hours. For the samples immediately after the stewing and after the storage at 60° C., sensory evaluation was performed according to the follow-

TABLE 3

| | Examples | | | | | | | | |
|---|---|---|---|---|---|---|---|---|---|
| | 8 | 9 | 10 | 11 | 12 | 13 | 14 | 15 | 16 |
| Solid ingredient | Onion | | | Cabbage | | | Carrot | | |
| Flavor content (% by mass) | | | | | | | | | |
| Lemon flavor (emulsion type) | 0.1 | — | — | 0.1 | — | — | 0.1 | — | — |
| Ginger flavor (oil-soluble) | — | 0.02 | — | — | 0.02 | — | — | 0.02 | — |
| Mustard flavor (oil-soluble) | — | — | 0.05 | — | — | 0.05 | — | — | 0.05 |
| Solid ingredient content (% by mass) | | | | | | | | | |
| 0.5 to 3 mm | 5 | 5 | 5 | 2 | 2 | 2 | 3 | 3 | 3 |
| 3 to 8 mm | 25 | 25 | 25 | 23 | 23 | 23 | 27 | 27 | 27 |
| 8 to 20 mm | 1 | 1 | 1 | 5 | 5 | 5 | 0 | 0 | 0 |
| Aspect ratio of solid ingredient | 2.5 | 2.5 | 2.5 | 4.4 | 4.4 | 4.4 | 2.2 | 2.2 | 2.2 |
| Repose angle α | 47 | 47 | 47 | 42 | 42 | 42 | 41 | 41 | 41 |
| <Sensory evaluation result> | | | | | | | | | |
| Aroma after heating | 5 | 4 | 4 | 5 | 4 | 5 | 4 | 4 | 3 |

TABLE 4

| | Comparative Examples | | | | | |
|---|---|---|---|---|---|---|
| | 9 | 10 | 11 | 12 | 13 | 14 |
| Solid ingredient | Mustard seed | | | Toasted sesame | | |
| Flavor content (% by mass) | | | | | | |
| Lemon flavor (emulsion type) | 0.1 | — | — | 0.1 | — | — |
| Ginger flavor (oil-soluble) | — | 0.02 | — | — | 0.02 | — |
| Mustard flavor (oil-soluble) | — | — | 0.05 | — | — | 0.05 |
| Solid ingredient content (% by mass) | | | | | | |
| 0.5 to 3 mm | 2 | 2 | 2 | 0 | 0 | 0 |
| 3 to 8 mm | 28 | 28 | 28 | 30 | 30 | 30 |
| 8 to 20 mm | 0 | 0 | 0 | 0 | 0 | 0 |
| Aspect ratio of solid ingredient | 1.2 | 1.2 | 1.2 | 1.8 | 1.8 | 1.8 |
| Repose angle α | 37 | 37 | 37 | 39 | 39 | 39 |
| <Sensory evaluation result> | | | | | | |
| Aroma after heating | 1 | 2 | 3 | 1 | 2 | 2 |

From Table 3, the liquid condiments of Examples 8 to 16 in which dried vegetable pieces having a particular repose angle and aspect ratio were used had a good aroma after the heating and were extremely excellent.

On the other hand, from Table 4, the liquid condiments of Comparative Examples 9 to 14 in which dried vegetable pieces having a particular repose angle and aspect ratio were not used had a weak savor and were not satisfactory.

Examples 17 to 20

(Method)
A solid ingredient-containing liquid condiment was made as in Example 11 except that cabbage was prepared so as to have an aspect ratio shown in Table 5. Evaluation was performed according to the following sensory evaluation method.

The solid ingredient content (% by mass) of the obtained solid ingredient-containing liquid condiment, the aspect ratio of the solid ingredient, and the results of sensory evaluation are described in Table 5.

ing criteria by comparison with the sample before the cooking by a total of four trained sensory examiners.

<Intensity of Aroma of Liquid Condiment>
5; the aroma remains very well
4; the aroma remains well
3; the aroma remains a little
2; the aroma slightly remains
1; no aroma remains

TABLE 5

| | Examples | | | |
|---|---|---|---|---|
| | 17 | 18 | 19 | 20 |
| Solid ingredient content (% by mass) | | | | |
| 0.5 to 3 mm | 5 | 2 | 0 | 0 |
| 3 to 8 mm | 25 | 23 | 8 | 6 |
| 8 to 20 mm | 0 | 5 | 22 | 24 |

TABLE 5-continued

| | Examples | | | |
|---|---|---|---|---|
| | 17 | 18 | 19 | 20 |
| Aspect ratio of solid ingredient | 1.8 | 4.4 | 9.6 | 20.2 |
| <Sensory evaluation result> | | | | |
| Aroma of lemon (immediately after stewing) | 5 | 4 | 4 | 3 |
| (after stewing and storage at 60° C. for 4 hours) | 5 | 4 | 3 | 3 |

From Table 5, the liquid condiments of Examples 17 to 19 in which a solid ingredient having a particular aspect ratio was used had a good aroma after the heating and after the following storage at 60° C.

Example 21 and Comparative Example 15

Example 21

A frying pan was preheated, salad oil was lightly put, and then about 200 g of sliced pork was heated over medium heat until browned. After the heat was turned off, 60 g of the onion ingredient-containing, ginger-savored liquid condiment of Example 9 was added, and the sliced pork was covered with the liquid condiment. After the cooking, the sliced pork was allowed to stand at room temperature for 5 hours and heated in a 600 W microwave oven for 1 minute and 30 seconds.

After the heating and after the reheating in the microwave oven, sensory evaluation was performed for each. For the pork after the heating, the ginger savor was sufficiently added, and the pork was satisfactory. In addition, also after the reheating in the microwave oven, compared with the pork immediately after the heating, the aroma rising (fragrance) slightly weakened, but the ginger savor when the pork was eaten was sufficient, and the pork was satisfactory.

Comparative Example 15

Sliced pork was cooked as in Example 21 except that a ginger-savored liquid condiment containing no ingredient was used. Similarly, after the cooking, the sliced pork was allowed to stand at room temperature for 5 hours and heated in a 600 W microwave oven for 1 minute and 30 seconds.

As in Example 21, after the heating and after the reheating in the microwave oven, sensory evaluation was performed for each. Compared with Example 21, the aroma rising (fragrance) immediately after the heating was weak, and after the reheating by the microwave oven, there was little aroma rising (fragrance), and the ginger savor was considerably weak also when the pork was eaten.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A liquid condiment, consisting of:
a seasoning liquid comprising vinegar in an amount of 0.05% to 2% and one or more selected from the group consisting of a fruit juice, a flavoring oil, a flavor, and a spice extract; and
one or more dried vegetables that are immersed and swollen in the seasoning liquid,
wherein:
a water content of the one or more dried vegetable is 8% by mass or less before immersion of the one or more dried vegetables in the seasoning liquid,
an aspect ratio of the dried vegetables is in the range of 1.8 to 5,
the one or more dried vegetable has a size of 0.5 mm or more and less than 20 mm after swelling,
the liquid condiment contains the dried vegetable having a size of 0.5 mm or more and less than 3 mm after swelling in an amount of 5 to 30% by mass based on the entire liquid condiment,
the liquid condiment contains the dried vegetable having a size of 3 mm or more and less than 8 mm after swelling in an amount of 5 to 50% by mass based on the entire liquid condiment,
the liquid condiment contains the dried vegetable having a size of 8 mm or more and less than 20 mm after swelling in an amount of 1 to 30% by mass based on the entire liquid condiment, and
the liquid condiment contains the dried vegetable having a size of 0.5 mm or more and less than 20 mm in an amount of 30 to 60% by mass based on the entire liquid condiment.

2. The liquid condiment according to claim 1, wherein the solid ingredient has an angle of repose of $40°<\alpha<50°$ in a dry state,
wherein the angle of repose is calculated from "tan $\alpha$=H/r",
wherein r (cm) is a radius of a fixed disk having a retaining edge, and H (cm) is a difference in height between the highest point of the retaining edge and the highest point of a generally conical laminate having symmetry, and
wherein the generally conical laminate is formed by injecting the solid ingredient on the fixed disk.

3. The liquid condiment according to claim 1, wherein the one or more dried vegetables are selected from the group consisting of onion, cabbage, Chinese cabbage, carrot, spring onion, celery, and paprika.

4. The liquid condiment according to claim 1, wherein the liquid condiment comprises the flavor that is an emulsion flavor or an oil-soluble flavor.

5. The liquid condiment according to claim 1, wherein the liquid condiment is for cooking.

6. The liquid condiment according to claim 1, wherein the liquid condiment comprises 5 to 15% by mass of the swollen vegetables having a size of 8 mm or more and less than 20 mm.

7. The liquid condiment according to claim 1, wherein the total amount of the swollen vegetables having a size of 0.5 mm or more and less than 20 mm is 30 to 55% by mass.

8. A liquid condiment, consisting of:
a seasoning liquid comprising vinegar in an amount of 0.05% to 2% and one or more selected from the group consisting of a lemon, ginger oil, mustard oil, ginger flavor, mustard flavor, and a spice extract;
one or more dried vegetables selected from the group consisting of cabbage, Chinese cabbage, green pepper, Japanese radish, Japanese radish leaves, beet, lotus root, burdock, spring onion, perilla, celery, parsley, paprika, tomato, cucumber, corn, cauliflower, eggplant, potato, sweet potato, taro, yam, and pumpkin, the one or more dried vegetable immersed and swollen in the seasoning liquid, wherein:
a water content of the one or more dried vegetable is 8% by mass or less before immersion of the one or more dried vegetables in the seasoning liquid;
an aspect ratio of the dried vegetables is in the range of 1.8 to 5; and
the one or more dried vegetable has a size of 0.5 mm or more and less than 20 mm after swelling,
the liquid condiment contains the dried vegetable having a size of 0.5 mm or more and less than 3 mm after swelling in an amount of 5 to 30% by mass based on the entire liquid condiment,
the liquid condiment contains the dried vegetable having a size of 3 mm or more and less than 8 mm after swelling in an amount of 5 to 50% by mass based on the entire liquid condiment,
the liquid condiment contains the dried vegetable having a size of 8 mm or more and less than 20 mm after swelling in an amount of 5 to 30% by mass based on the entire liquid condiment,
the liquid condiment contains of dried vegetable having a size of 0.5 mm or more and less than 20 mm in an amount of 30 to 60% by mass based on the entire liquid condiment, and
the liquid condiment is heat sterilized.

9. A liquid condiment, consisting of:
a seasoning liquid comprising vinegar in an amount of 0.05% to 2% and one or more selected from the group consisting of a lemon, ginger oil, mustard oil, ginger flavor, mustard flavor, and a spice extract;
a dried cabbage that is immersed and swollen in the seasoning liquid; and optionally sugar, salt, sodium glutamate, and xanthan gum; wherein:
the dried cabbage is prepared by mixing with a sugar or immersion in a solution containing the sugar before drying or/and is obtained by heating and mixing a cut cabbage in a solution of a calcium salt followed by drying,
a water content of the dried cabbage is 8% by mass or less before immersion of the dried cabbage in the seasoning liquid,
an aspect ratio of the dried cabbage is in the range of 1.8 to 5; and
the dried cabbage has a size of 0.5 mm or more and less than 20 mm after swelling,
the liquid condiment contains the dried cabbage having a size of 0.5 mm or more and less than 3 mm after swelling in an amount of 5 to 30% by mass based on the entire liquid condiment,
the liquid condiment contains the dried cabbage having a size of 3 mm or more and less than 8 mm after swelling in an amount of 5 to 50% by mass based on the entire liquid condiment,
the liquid condiment contains the dried cabbage having a size of 8 mm or more and less than 20 mm after swelling in an amount of 5 to 15% by mass based on the entire liquid condiment,
the liquid condiment contains the dried cabbage having a size of 0.5 mm or more and less than 20 mm in an amount of 30 to 60% by mass based on the entire liquid condiment, and
the liquid condiment is heat sterilized.

10. The liquid condiment according to claim 9, further comprising sugar, salt, sodium glutamate, and xanthan gum.

11. The liquid condiment according to claim 1, wherein the liquid condiment is heat-sterilized.

* * * * *